US008543427B2

(12) United States Patent
Noyes

(10) Patent No.: US 8,543,427 B2
(45) Date of Patent: Sep. 24, 2013

(54) WEATHER RISK MANAGEMENT SYSTEM

(75) Inventor: William E. Noyes, Barrington, IL (US)

(73) Assignee: Mac's Snow Removal, Inc., Wauconda, IL (US)

( * ) Notice: Subject to any disclaimer, the term of this patent is extended or adjusted under 35 U.S.C. 154(b) by 931 days.

(21) Appl. No.: 12/610,514

(22) Filed: Nov. 2, 2009

(65) Prior Publication Data

US 2011/0106727 A1 May 5, 2011

(51) Int. Cl.
*G06Q 40/00* (2012.01)
(52) U.S. Cl.
USPC ................................. 705/4; 705/40
(58) Field of Classification Search
USPC ....................................... 705/4, 40
See application file for complete search history.

(56) References Cited

U.S. PATENT DOCUMENTS

| | | | |
|---|---|---|---|
| 7,184,983 B2 | 2/2007 | Corby et al. | |
| 7,373,320 B1 | 5/2008 | McDonough | |
| 7,430,534 B2 | 9/2008 | Lof et al. | |
| 2004/0230519 A1* | 11/2004 | Parker | 705/37 |
| 2008/0010221 A1 | 1/2008 | Co et al. | |
| 2008/0249955 A1* | 10/2008 | Friedberg | 705/36 R |
| 2008/0313070 A1 | 12/2008 | Fell et al. | |
| 2009/0018892 A1 | 1/2009 | Grey et al. | |
| 2009/0024543 A1 | 1/2009 | Horowitz et al. | |

OTHER PUBLICATIONS

Lecomte, P., & McIntosh, W. (2006). Designing property futures contracts and options based on NCREIF property indices. Journal of Real Estate Portfolio Management, 12(2), 119-153. Retrieved from http://search.proquest.com/docview/197833861?accountid=14753.*

Yang, C. (2003). Weather derivatives: Corporate hedging and valuation. (Order No. 3116466, The University of Texas at Austin). ProQuest Dissertations and Theses, 212-212 p. Retrieved from http://search.proquest.com/docview/30530178?accountid=14753. (305301718).*

Ma, P. Y. (2006). A fresh engineering approach for the forecast of financial index volatility and hedging strategies. (Order No. NR20876, Ecole de Technologie Superieure (Canada)). ProQuest Dissertations and Theses, , 156-156 p. Retrieved from http://search.proquest.com/docview/304913337?accountid=14753. (304913337).*

* cited by examiner

*Primary Examiner* — Muriel Tinkler
(74) *Attorney, Agent, or Firm* — Vedder Price P.C.

(57) ABSTRACT

This disclosure relates to a system for managing financial risk associated with weather-based service contracts, and more specifically, to a system based on the purchase of weather derivatives to select, manage, minimize, and redistribute financial burdens associated with costs incurred from the payment of services related to greater than average weather-based events. An option contract having a tick price, and an associated premium at a fixed strike price is selected at a desired coverage, in one embodiment, the desired coverage is associated with a payout with the associated tick price that covers the base price of performing the service for a nominal weather condition, the premium of buying the option, and the price of performing the services for exceptional weather precipitations of a three standard deviation from the nominal value. If a hedge trader offers this service rather than a service provider, the desired coverage will also cover the a commission for the trade.

4 Claims, 5 Drawing Sheets

WEATHER RISK MANAGEMENT SYSTEM

FIELD OF THE DISCLOSURE

This invention relates to a system for managing financial risk associated with weather-based service contracts, and more specifically, to a system for managing and minimizing financial risk associated with the purchase of weather-related services.

BACKGROUND

Shakespeare wrote in *Macbeth*, "The night has been unruly: where we lay, Our chimneys were blown down . . . . Some say the earth was feverous, and did shake." Since the dawn of time, weather has played an important role in the wellbeing and prosperity of human society. Normal weather enables the growth of crops, food, and ultimately, wealth. With the arrival of modern society, the adverse influence of weather extremes has been somewhat controlled, yet many business models remain vulnerable to uncooperative weather. For example, beachside sporting events are rained out, tourist destinations lose visitors when hurricanes loom, roadways are damaged by earthquakes, planes fall from the sky during storms, and blizzards create white-out conditions across entire regions.

Every part of the globe falls victim to different types of weather-related events. Baghdad is subject to sandstorms, daylight is extinguished in Australian as locust swarms arrive, Taiwan suffers from Pacific typhoons, and the Midwestern states of the United States have recurring winter snowstorms. In the winter of 2009, 52 inches of snow fell on the greater Chicago area while the average is only 38 inches, straining contractual relationships between snow removal service providers and their clients.

The following disclosure describes a weather risk management system as implemented with respect to one weather condition, i.e., snowstorms and snow removal in the Midwestern states of the United States. However, this disclosure is to be read broadly to encompass any and all weather-related events around the world where the described principles can be applied with equal force by simply changing the different input variables associated with the event.

Precipitation has been one of man's principal preoccupations. In 1550, Nostradamus published a weather forecasting guide before moving onto other, less reliable yet more infamous predictions. Prediction of weather-based events is futile because of the nonlinearity of the equations underlying these systems. In mathematics, a nonlinear system is a system in which time is not linked with the superposition principle, or put more simply, where an output is not proportional to the input. Nonlinear systems cannot be solved using fixed variables. For example, no equation can predict the outcome of the state lottery. Similarly, no equation can predict the weather reliably. Further, weather is believed to follow the so-called "butterfly effect," where simple changes in one part of the system produce complex effects throughout the remainder. The inherent unpredictability of weather can only be managed, not bested.

Predicting weather is not unlike predicting stock market fluctuations or lottery drawings. While historical averages are useful to understand potential future results, it is impossible to predict weather far in advance, much less predict extraordinary weather events and conditions that occur infrequently in an area and are based on a juxtaposition of many effects. For snow storms or even blizzards to occur (i.e., heavy snowfalls), weather fronts must collide at a junction of warmer air with greater water density and a polar air mass. As these different air masses connect, overall air density equalizes by releasing water vapor to the ground. If surface temperatures are below the freezing point of water, the water vapor falls as snow.

Meteorologists attempt to predict precipitation deposited on the Earth's surface. Precipitation comes in the form of rain, hail, and snow. The depth of a snowfall is often measured using standard rain gauges having a diameter of 4 inches (plastic) or 8 inches (metal) and adjusted to allow for collection inside the cylinder. Antifreeze liquids may be added to melt snow or ice that falls into the gauge. Once a snowfall is finished accumulating, the amount of water is recorded. When a snow measurement is made, various networks exist across the United States and elsewhere, such as CoCoRAHS® or GLOBE®, to record the measurements. For example, Chicago is situated on the warmer side of Lake Michigan. That large body of water creates effects that result in an significant variability in precipitation from one part of the greater Chicago area to the next. For this reason, index points are taken as references from, for example, the National Oceanic and Atmospheric Administration (NOAA) at different collection sites around Chicago, such as the Chicago Botanical Garden, the Chicago O'Hare Airport, the City of Elgin, and the City of Northbrook. Over the last 150 years, the greater Chicago area has received a yearly average of 38 inches of snow.

Today, most climate experts agree that global warming is a real phenomenon. Increasing atmospheric temperatures tend to increase evaporation, increasing the water vapor in the air, which in turn leads to more precipitations. As average global temperatures rise, average global precipitation increases. Precipitation has generally increased over land north of 30 deg N from 1900 through 2005 but has declined over the tropics since the 1970s. Globally, there has been no statistically significant overall trend in precipitation over the past century, although trends have varied widely by region over time. Once again, the nonlinearity of weather makes forecasting impossible. Global warming is also believed to increase the risk of variability of precipitation, resulting in years with greater than average snowfalls and years with far below average snowfalls. This phenomenon is often called "weather extremes." Therefore, risk associated with extreme weather conditions is predicted to increase over the coming decades, and solutions and systems to reduce risk associated with these conditions are needed.

Municipalities and other entities, such as shopping mall owners, have large surface areas that require snow removal after snow storms. Snow must be removed quickly, often overnight, so that life and commerce may continue with minimal interruption. Rapid response time requires numerous personnel and a large fleet of snow removal equipment. It is often not viable for municipalities or other entities to incur the cost of ownership of equipment and associated storage and personnel fees to manage infrequent snowfalls. One solution is to contract with a snow removal service provider operating across a larger area. For example, a snow removal corporation may operate in the greater Chicago area and service a plurality of clients at different locations within the area. These service providers may diversify into summer and winter services and cover wide areas to maintain the availability of personnel and equipment.

Municipalities, like other entities, must budget for snow removal costs. Municipalities may elect to sign a per event contract with a snow removal service provider. Under such a contract, each time a snowfalls occurs, the service provider agrees to perform the service for a fixed price. In anticipation of low precipitation years where clients will not require the service but the service provider will nevertheless have to pay fixed costs, the per event price offered takes into consideration and spreads fixed costs. In years of high precipitation, municipalities may end up overpaying for fixed costs that have already been factored into the first few event calls for the year. Further, as the season unfolds, service providers may be overrun with demand in times of exceptional snowfall and incur additional costs such as, for example, overtime pay and extraordinary vehicle maintenance.

Municipalities may strong-arm service providers into signing a fix priced contract for a full season of service. This solution is problematic on many levels for both parties. When precipitation is at a minimum, the municipality may be criticized by taxpayers for contracting and paying for a service it does not use, whereas when precipitations far exceed averages, the financial strain placed on the service provider may result in a failure to perform or other unacceptable outcomes such a bankruptcy. Therefore, what is needed is a system that can be implemented as a layer between the service provider and the client as an alternative to per event or fixed price contracts.

Financial derivatives are financial instruments derived from some form of asset, index, event, value, or condition known as the underlying condition. Rather than trade or exchange the underlying condition itself, derivatives traders enter into agreements to exchange cash or assets over time based on the underlying condition. For example, options contracts are an agreement between two parties, such as between the holder of a stock and a prospective buyer of a stock, to exchange the underlying stock at a future date for a fixed price if a strike price is met or exceeded. The derivative is sold at a premium. At a strike price, i.e., a price upon which money is due based on a realized condition, a payout is made in incremental value based on the underlying condition. In the case of a weather derivative such as a snow precipitation derivative at a location, the strike price can be a fixed quantity of snow, or an expected nominal snow precipitation at the location. The option is then paid out at a payout calculated from a set tick price multiplied by the number of units such as inchs of snow above the strike price or possibly the yearly nominal estimate.

Hedging is a technique to reduce risk using derivatives. For example, a farmer may sign a futures contract to exchange for a specific amount of cash a specified amount of wheat in the future. For the farmer, the uncertainty of the sale price is removed and the miller will have a known availability of wheat. Also, by fixing the price, the farmer is assured a minimum price independent of momentary market conditions, and the miller is also assured the same price.

There are many types of derivatives, including over-the-counter (OTC) derivatives, exchange-traded derivatives (ETD) directed at futures contracts, options contracts, and swaps contracts. U.S. patent application Ser. No. 12/221,935 describes a system for trading derivatives based on natural peril events. This system allows users to bet on different natural events such as snowstorms or hurricanes. Based on the probability of occurrence of an event at any moment in time, shares of a fund are purchased that have a payback in proportion with the assumed risk. In this scenario, a municipality faced with a low probability of being hit with the unusually high snow removal fees associated with a blizzard may hedge against itself by purchasing shares of this derivative. Assuming, for example, a probability of 5% of occurrence and a payback of 15 to 1, a municipality wanting to cover costs of $1 million may invest $66,666 dollars and will collect the needed sum if the blizzard hits. The problem is that a municipality is then engaged in gambling, essentially betting against itself, and 19 times out of 20, losing the invested sum. The solution described in this reference is not well adapted to managing financial risks associated with extreme weather events.

U.S. patent application Ser. No. 11/775,883 describes a system where a service, such as a help line for information technology, must be used and billed "on-demand" while actual usage volumes are unknown. A service provider is then used as an intermediary between an end user of the service and the service provider. The payment of a fee by the user is split in two, a first to purchase an initial quantity of services, and the second to buy a future option derivative to reserve a capacity to obtain more services in the future if the demand exceeds the paid initial portion. Derivatives of the services are used only for future reserves to demand. What is needed is a system that allows a service provider to cover risk without being forced to provide deferred services.

The use of weather derivatives is known. U.S. patent application Ser. No. 11/732,533 describes systems and modules to create customized weather derivatives. Much like option contracts, weather derivatives can be purchased by traders, but the use of derivatives is complex and difficult and often too complex to act as a useful tool to manage risk for users of services in the weather industry. What is needed is a system to manage weather risk that creates a weather derivative that minimizes financial risk to the parties while covering the service provider and the service user for any weather condition.

SUMMARY

This disclosure relates to a system for managing financial risk associated with weather-based service contracts, and more specifically, to a system based on the purchase of weather derivatives to select, manage, minimize, and redistribute financial burdens associated with costs incurred from the payment of services related to greater than average weather-based events. An option contract having a tick price, and an associated premium at a fixed strike price is selected at a desired coverage, in one embodiment, the desired coverage is associated with a payout with the associated tick price that covers the base price of performing the service for a nominal weather condition, the premium of buying the option, and the price of performing the services for exceptional weather precipitations of a desired standard deviation from the nominal value. If a hedge trader offers this service rather than a service provider, the desired coverage will also cover the a commission for the trade.

BRIEF DESCRIPTION OF THE DRAWINGS

Certain preferred embodiments are shown in the drawings. However, it is understood that the present disclosure is not limited to the arrangements and instrumentality shown in the attached drawings.

DETAILED DESCRIPTION

Figure 1:
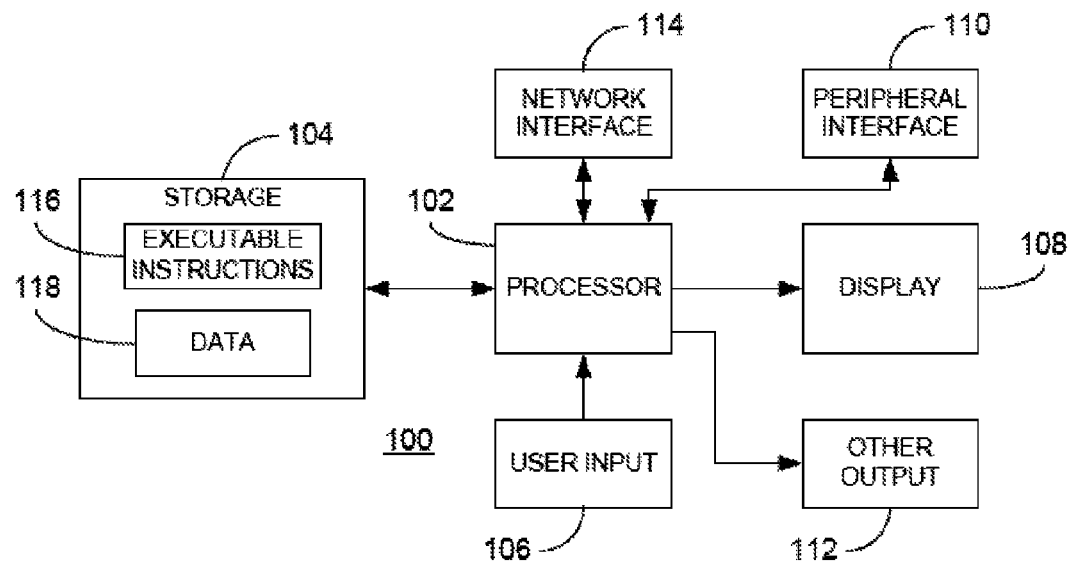
FIG. 1 is a block diagram of a computer system that may be used to implement the various embodiments described in the present disclosure.

For the purposes of promoting and understanding the invention and principles disclosed herein, reference is now made to the preferred embodiments illustrated in the drawings, and specific language is used to describe the same. It is nevertheless understood that no limitation of the scope of the invention is thereby intended. Such alterations and further modifications in the illustrated devices and such further applications of the principles disclosed as illustrated herein are contemplated as would normally occur to one skilled in the art to which this disclosure relates.

FIG. 1 illustrates a representative processing device 100 that may be used to implement the teachings of the present disclosure. The device 100 may be used to implement, for example, one or more components of the devices or associated systems and methods illustrated in FIGS. 2-6 as described in greater detail below. The device 100 comprises a processor 102 coupled to a storage component 104. The storage component 104, in turn, comprises stored executable instructions 116 and operational data 118 (i.e., data that is operated upon by components implemented by the stored executable instructions 116). In one embodiment, the processor 102 may comprise one or more processing devices such as a microprocessor, microcontroller, digital signal processor, or combinations thereof capable of executing the stored instructions 116 and operating upon the stored data 118. Likewise, the storage component 104 may comprise one or more memory devices such as volatile or nonvolatile memory, including but not limited to random access memory (RAM) or read only memory (ROM). Processor and storage arrangements of the types illustrated in FIG. 1 are well known to those having ordinary skill in the art. In one embodiment, the processing techniques described herein are implemented as a combination of executable instructions and data within the storage component 104.

As shown, the device 100 may also comprise one or more user input devices 106, a display 108, a peripheral interface 110, other output devices 112, and a network interface 114 in communication with the processor 102. The user input device 106 may comprise any mechanism for providing user input (such as inputs specifying query topics, entity types, etc. as described below) to the processor 102. For example, the user input device 106 may comprise a keyboard, a mouse, a touch screen, microphone and suitable voice-recognition application, or any other means whereby a user of the device 100 may provide input data to the processor 102. The display 108 may comprise any conventional display mechanism such as a cathode ray tube (CRT), flat panel display, or any other display mechanism known to those having ordinary skill in the art. The peripheral interface 110 may include the hardware, firmware, and/or software necessary for communication with various peripheral devices, such as media drives (e.g., magnetic disk or optical disk drives), other processing devices, or any other input source used in connection with the various embodiments described herein. Likewise, the other output device(s) 112 may optionally comprise similar media drive mechanisms, other processing devices, or other output destinations capable of providing information to a user of the device 100, such as speakers, LEDs, tactile outputs, etc. Finally, the network interface 114 may comprise hardware, firmware, and/or software that allows the processor 102 to communicate with other devices via wired or wireless networks, whether local or wide area, private or public, as is well known in the art. For example, such networks may include the World Wide Web, the Internet, or private enterprise networks, such as are well known in the art. In FIG. 1, the network interface 114 is shown by the data communication link 19.

While the device 100 has been described having one form for implementing the techniques described herein, those having ordinary skill in the art will appreciate that other, functionally equivalent forms and techniques may be employed. For example, as known in the art, some or all of the executable instructions and functionality may be implemented using firmware and/or hardware devices such as application-specific integrated circuits (ASICs), programmable logic arrays, state machines, etc. Further still, other implementations of the device 100 may include a greater or lesser numbers of components than those illustrated. Once again, those of ordinary skill in the art will appreciate the wide number of variations that may be used to obtain fundamentally equivalent functionality.

Figure 2:
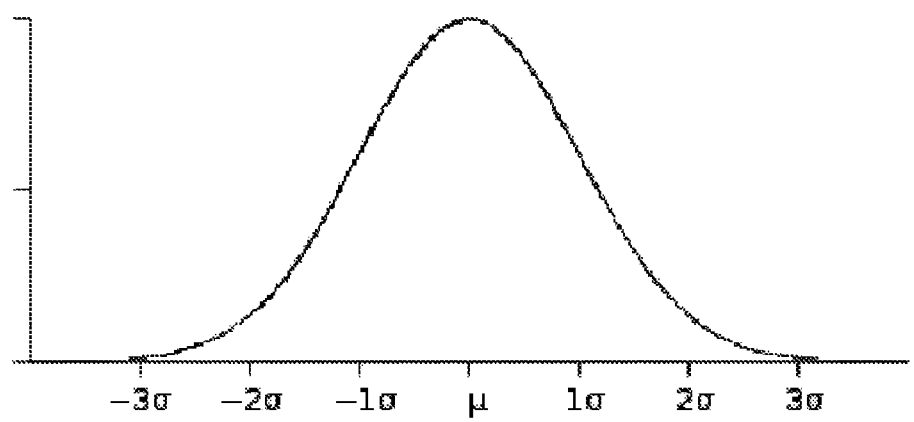
FIG. 2 is an a graphical representation of a standard deviation curve and associated 1, 2, and 3 standard deviations from the norm.

FIG. 2 is an a graphical representation of a standard deviation curve and associated 1, 2, and 3 standard deviations from the norm. In relation to this disclosure, the standard deviation represents the distribution and associated risk associated with a given security to exceed returns when associated with a weather condition. Standard deviation provides a quantified estimate of the uncertainty of future returns. For example, snow precipitations in the Chicago area are centered at 38 inches. With three standard deviations what is desired is a value of the risk, the distribution, and in the case of snow derivatives the precipitation where 99.7% of years, or only 1 year out of 333 will see precipitations to exceed the selected value. For example, for precipitations in the Chicago area, the value was measured as the third standard derivation on the plus side is 76 inches or twice the average precipitation. One of ordinary skill in the art of the calculus of standard deviations will understand that the curve at FIG. 2 is only illustrative of a possible distribution and that the shape, bell curve width or height, is subject to change based on external conditions. For example, if and when global warming is quantified in regards to snow precipitations at a specific area, the value of the third derivation, may change.

Figure 3:
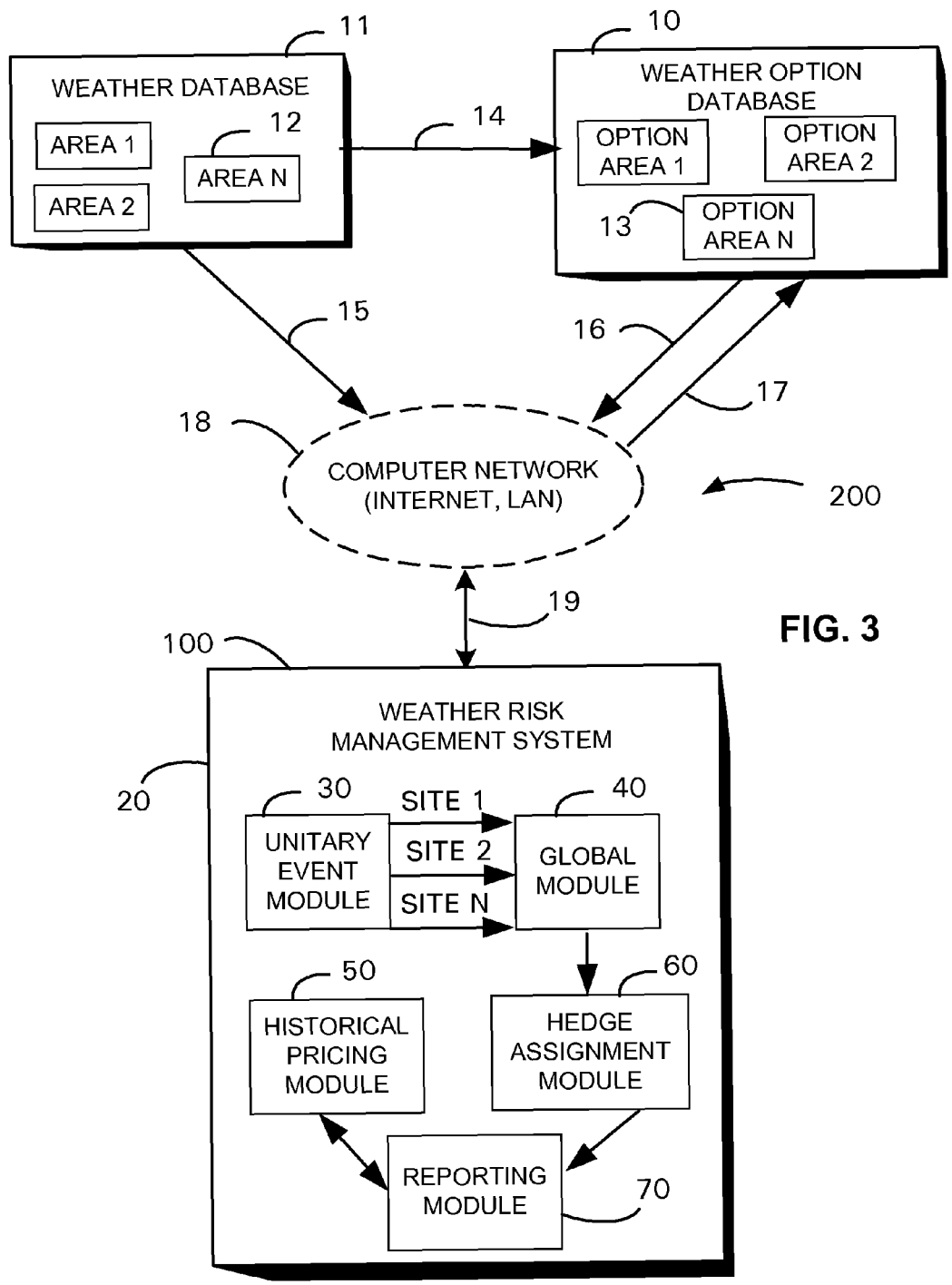
FIG. 3 is a block diagram of the weather risk management system operating over computer networks and in connection with external sources of weather-related information according to an embodiment of the present disclosure.

FIG. 3 shows a general platform 200 for the cost management of weather-related services, such as, for example, the management of snow and ice removal in an area of the United States such as the greater Chicago area. Within this disclosure, the term "platform" is to be understood generally as any interface, structure, or system and method thereof that is capable of performing the function of allowing a user to launch and operate a weather risk management system 20 and ultimately manage costs for snow removal services. In one described embodiment, the management of costs is associated with offering weather-related services such as the snow removal from surface areas at different sites in an area.

The platform 200 includes a weather risk management system 20 implemented into a computer such as the device shown at FIG. 1 in data communication 19 to a computer network 18 such as the Internet, a local area network (LAN), or other series of connected microprocessors for joint data transfer. As shown by arrows 15, 16, 17, and 19, the transfer of data, such as additional input information from a weather database 11 and a weather option database 10 to the weather risk management system 20, is contemplated. While FIG. 3 shows a computer network 18 as in interacts within this platform 200, one of ordinary skill in the art will understand that well before the Internet was operational, data was transferred via phone lines, written instruments, and even communication signals on market floors. Therefore, it may be understood that future data storage and data transfers between different elements, such as the different constituents of the platform 200, may be directed at new technology, such as wireless data transfer, infrared data communication, or even optical network data transfer.

While the current best mode is described, other possible data transfer systems are also contemplated. As a way of example, Internet communication can be accomplished automatically where data is called and entered directly into the weather risk management system 20 by programming of software operating through hardware communication ports, but other uses where an operator has a plurality of HTML browser windows open at a single or adjacent terminals uses his/her knowledge and/or his/her expertise to conduct the transfer of information by manual entry into the management system 20 via a keyboard, a mouse, or other user interface.

Figure 4:
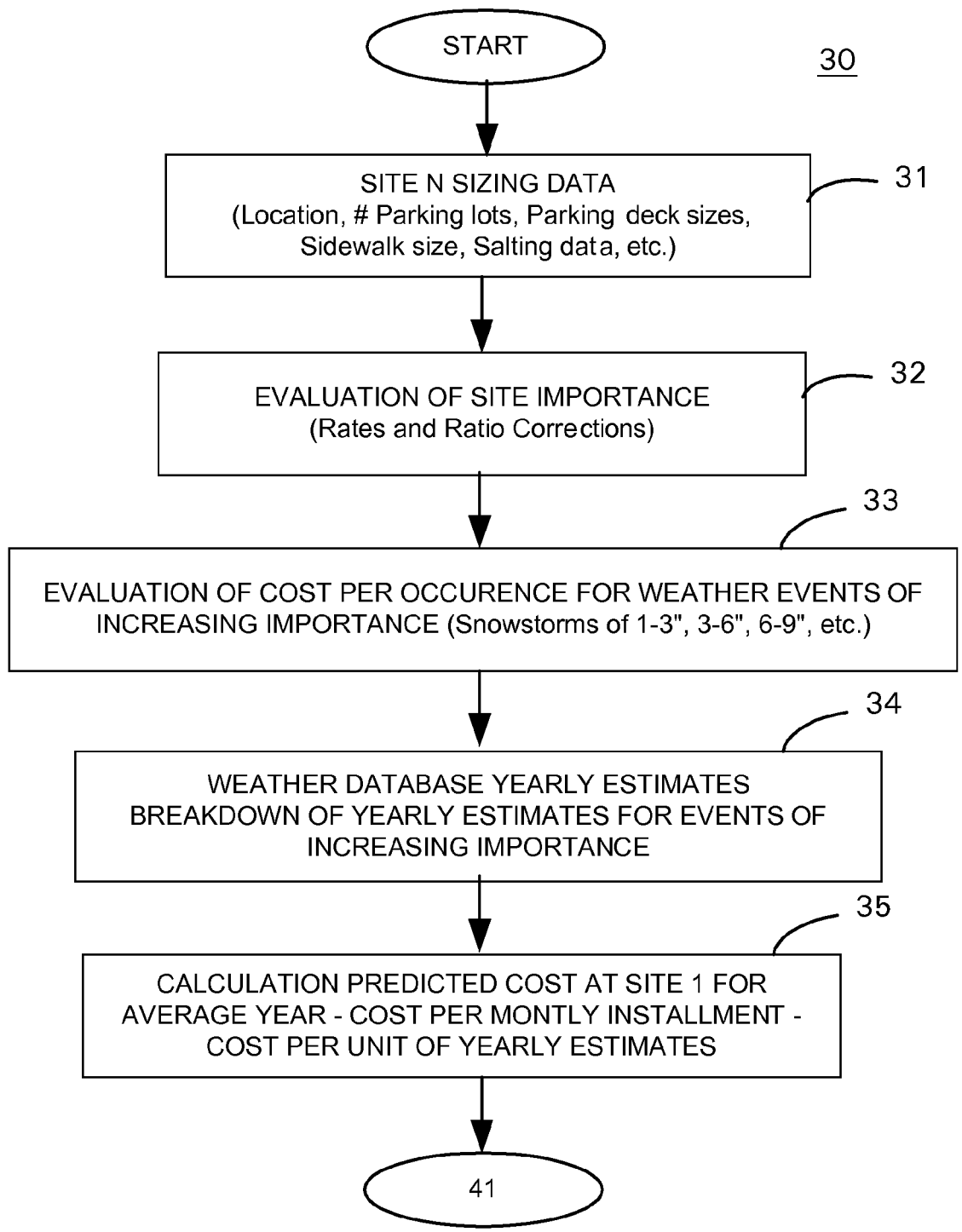
FIG. 4 is a block diagram representation of the different steps of operation of the unitary event module as part of the weather risk management system of FIG. 3.

The weather risk management system 20 is shown with a plurality of modules 30, 40, 50, 60, and 70 operating within the device 100, such as a personal computer, a personal digital equipment, or a cell phone equipped with wireless capability and data browsing. The modules include a unitary event module 30 for calculating at least a cost 35 as shown in FIG. 4 at a site in an area. Some of the steps and functions of the unitary event module 30 are shown with greater detail in FIG. 4. Former per event proposals, often paper-based estimates given by service providers to clients and users of the services, are documents summarizing the different elements of coverage between the parties. These documents include a period of coverage, the description of the services, a breakdown of the costs of the service for the different portions at a site in an area, time and material costs for fixed price extras, taxes, and other legal contractual clauses. The proposals allowed a service provider, not unlike the unitary event module, to calculate and predict the costs of the service 35 at a site for an average year. A service provider could also predict the cost of monthly installments, or even the cost per unit of yearly estimates taken from a weather database.

In the unitary event module 30, a user enters different sizing data 31, such as the locations of the sites, the number of parking lots, the shapes of the lots, the sizes of decks, the sizes of sidewalks, and the data associated with the salting and sanding needed when a service function must be performed at the site. While some of the different pricing and cost estimation elements linked with the snow removal process are listed, any type of weather sizing data is contemplated. Once this information is entered, often manually by an operator on a user interface of the device 100, the module 30 conducts an evaluation of the importance 32 of the site and corrects the rates and ratios of the different fixed costs associated with performing the services. For example, in one embodiment, a spreadsheet can determine the per event cost by entering as data the parking lot space sizes, the gridded parking lot size, the deck size, and the sidewalk surface. A price per surface element is entered with or without a site importance correction. The predicted commodity costs also factor into the determination of the fixed costs associated with a service. Other parameters can factor into the fixed costs, such as the salaries of personnel needed to perform the services. Other business models require that personnel costs not be factored into the fixed costs.

The module 30 then evaluates the cost per occurrence for weather events of increasing importance 33. For example, snowstorms are classified into storms of 1-3 inches, 3-6 inches, 6-9 inches, and so forth. This classification allows for the determination of cost associated with the removal of thicker layers of snow that result in a different equipment need. Predictably, if 10 storms of 1 inch must be serviced over a snow season, the cost is greater than servicing a single storm of 10 inches even if the snow removal of the single storm takes more time than the removal of 1 inch of snow. Some of the fixed costs increase, such as the quantity of salt that must be placed on the ground, but other costs such as the time needed to clear a surface area remain substantially constant.

The unitary event module 30 allows for the determination and calculation 35 of the predicted cost associated with the removal of a single inch of snow at the site for an average year, along with the determination of an average cost per event as it obtains 34 from the weather database 11 yearly estimates at the location. The per event cost calculation and the associated module 30 allows for the determination of a price per snow removal that is then multiplied by the expected yearly estimates. In the greater Chicago area, some regions have a yearly estimate of 38 inches. The total precipitation may be broken down by estimate of events (i.e., how many times it snows in an area) in order to determine the cost at a site. If a price of a single event averaged over the different thickness to be removed is calculated by the module 30 as $1,596, and 15 plowings and 30 salt applications are required in the greater Chicago area to remove the 38 inches snowfall over a season, then a predicted cost of an average season would be $28,320. Again, since snow removal is a seasonal weather-related service, most contracts can be paid during the winter months. In one preferred embodiment, 5 monthly installments can be used to pay the average seasonal snow removal fee, and this cost per monthly installment is also calculated by the module 30. Finally a cost per inch of snow or unit of the yearly estimate can be calculated, which in this case has a value of $745 for this site.

As shown in FIG. 3, the weather database 11 contains data for a plurality of areas 12, shown as areas 1, 2, . . . N. The weather option database 10 may also contain options for different areas 1, 2, . . . N, where the different areas may differ in size, location, etc. For example, if weather databases from NOAA in the greater Chicago area contain snowfalls for the O'Hare Airport, Elgin, and Northbrook, the option database may only contain options for a fraction of these. An arrow 14 indicates a possible relationship where the weather option database 10 may require data from the weather database 11 to create options with the appropriate premiums, and strike prices.

Next, a global module 40 is used for calculating at least a base price for services at one or more of a plurality of sites 1, 2, . . . N as shown in FIG. 3. The global module 40 imports the costs calculated by the unitary event module 30 in the order shown in FIG. 5 to calculate base prices for services based on yearly estimates for 1 to N sites 44. For example, clients may have a plurality of properties located in different areas 1, 2, . . . N subject to different yearly weather estimates. The client may desire to obtain a single yearly price to be paid for the totality of his properties. In another embodiment, the use of a plurality of sites located in different areas allows for the determination of average values that are less likely to be vulnerable to seasonal variations. While the global module 40 is shown as taking data from a plurality of sites, a global module 40 for the processing of a single site 41 is contemplated, since N may vary from 1 to N.

The global module 40 assigns in one embodiment to the sites 1 to N a correction factor 42 or a multiplier that is based on extraneous factors such as the location of the site, the clustering of the sites relative to each other, the proximity to highways or access centers, the proximity to other properties, or any other factor that may significantly alter the price of the overall service for a totality of sites 1 to N. In one embodiment, the base price (BP) 44 is calculated for services for yearly estimates for the sites. Each of the costs 1 to N are then summed with a different correction factor 1 to N.

$$BP = \sum_{j=1}^{j=N} \text{COST AT SITE}_j * \text{CORRECTION FACTOR}_j$$

For example, a client may own four sites, the first three being schools with lots that may be easily accessible but are distant from each other, and a mall located in the vicinity of the first school. A correction factor of 1.1 may be used (+10% in price) for each school because work must be conducted during off hours when the school is not in use and because schools require specific attention to sidewalks owing to children not having as sure footing as most adults. The mall may be given a correction factor of 0.8 (−20% in price) since the mall will be cleared by the same team of workers removing snow at the neighboring school, but this time before the opening of the mall several hours later. If the unitary event module had calculated a per event price of $25,000 for each of these four sites the BP of $102,500 may be calculated with the above equation [BP=$25,000×1.1+$25,000×1.1+$25,000×1.1+$25,000×0.8].

Returning to FIG. 3, a hedge assignment module 60 is used to obtain and assign a premium 63 to an option having a strike price, in one embodiment of the nominal average of snow precipitation in an area. The module 60 also determines a tick price (i.e. the price for each unitary of precipitation above the strike price value) for the payment of the option. In one embodiment, a premium is calculated by the hedge assignment module 60 for each and all of the properties 1 to N. In another embodiment, a premium is determined for each site and is uploaded 61 from the options database 10.

Figure 5:
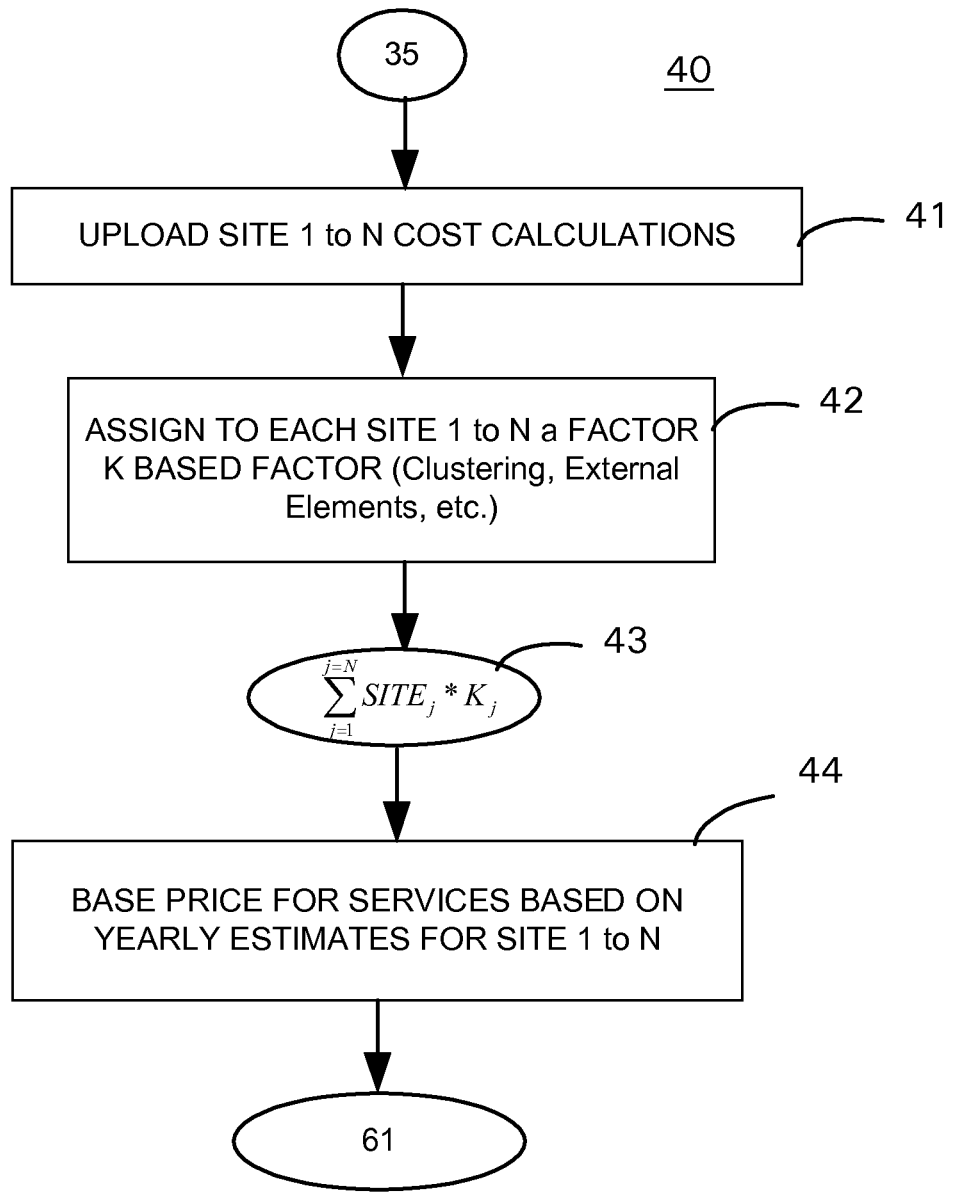
FIG. 5 is a block diagram representation of the different steps of operation of the global module as part of the weather risk management system of FIG. 3.
Figure 6:
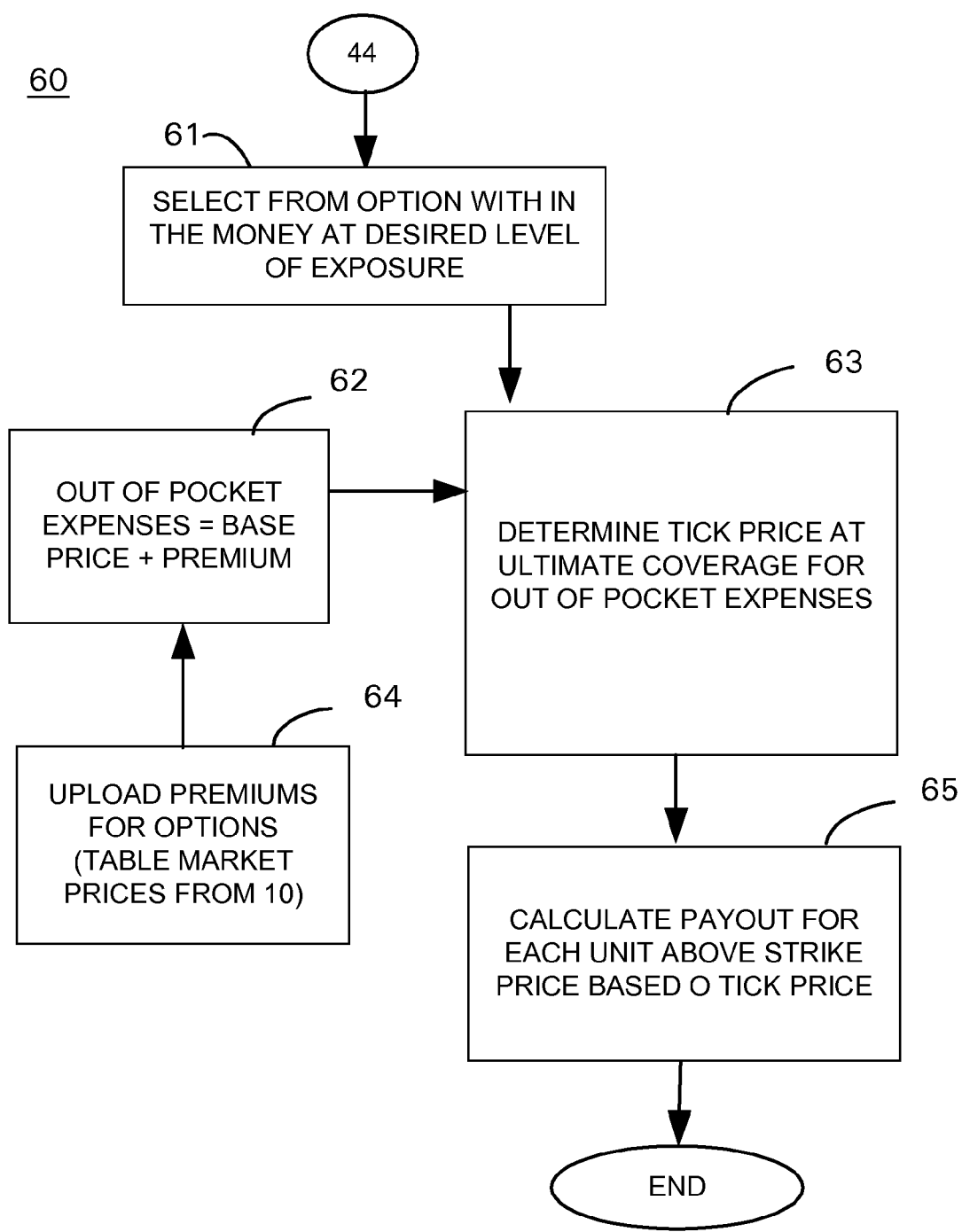
FIG. 6 is a block diagram representation of the different steps of operation of the hedge assignment module as part of the weather risk management system of FIG. 4.

FIG. 6 shows how the hedge assignment module 60 operates. Data is entered from the base price 44 as shown at FIG. 5. Options in a preferred embodiment are first taken where the desired yearly precipitation amount corresponds to the strike price where the option is in the money. These options correspond to a bet that any deviation from the strike price will result in payment of the option. This can be both on the up side or the down side. For example, options for the Chicago area can be taken to have a strike price of 38 inches in snow precipitation that corresponds to the nominal precipitation where each incremental value of snow, such as a fall of one inch results in the payment of one increment of the tick price. An option with a tick price of $2,700 and a strike price of 38 inches of snow will result in the payment to the bearer of $5,400 for a precipitation of 40 inches or two inches over the nominal strike price and ultimately of the payment of the entire calculated base price and premium if the precipitation is twice the yearly nominal value.

At step 61 as shown on FIG. 6, options may be taken with a strike price of the yearly nominal precipitation and is selected with an in the money at a desired level of exposure. An out of pocket expense 62 is then calculated directly or after internal iterations from the platform and is the base price (BP) plus the premium of the option. In an alternate embodiment the ultimate coverage desired, a value that is then used to determine a tick price 63 for the payout at ultimate coverage for out of pocket expenses, this value is associated with a premium and is uploaded from the options market 10. The hedge assignment module 60 determines the tick price by asking the user for the per service or unit coverage needed or by using a predetermined value that is associated with a standard deviation from the normative value. For example, clients may imagine and require protection for the normal precipitation plus a fixed number of inches of snow removal. Other clients may ask the platform to cover most contemplated situations, associated in this case as a third standard deviation based on a snow fall that is equal or greater than the nominal value.

The tick price is then calculated as the expenses above the yearly estimate at the ultimate coverage desired based on an extrapolation of the calculation of the price per inch in relation to the nominal calculation rate for the base price. For example, in the Chicago area, the yearly nominal estimate are 38 inches, in order to determine an extrapolated cost of removing another 38 inch above the nominal value, the base price BP is taken and is added to the premium 62. For example, if the out of pocket expenses are $100,000 (corresponding to the price to perform the clean up operation and the service of cleaning a total of 38 inches of snow of $90,000, paying the premium associated with the option of $7,000, and ultimately paying a commission of $3,000), then the tick price may be approximately $2,700 ($100,000/38) where the ultimate coverage desired is another 38 inches in one example. If a different and intermediary coverage is desired, such as 5 inches or any other level of protection, the value of the estimated seasonal out of pocket expenses above the desired strike price is calculated to approximately $13,200 or ($100,000/38)*5. A premium is then calculated iteratively by the module 60 along with the commission fee.

Using this platform, the tick price (i.e. the option payment per increment of snow precipitation) is greater than the cost of removing the increment of snow. The tick price is built so as to not only cover the additional price of offering the service of snow removal, but also is directed at paying back the invested capital for the snow removal if extraordinary snows occur. While this corresponds to one single embodiment, one of ordinary skill in the art will recognize that the service may be offered where the tick price is set to cover only the price of snow removal of snow levels above the nominal level and the premium and/or commission for offering the services.

In an alternate embodiment, the weather risk management system 20 further includes a reporting module 70 for producing a proposal report to a client with a yearly payment as the base price plus the premium. The reporting module may be programmed to produce a paper-based report or quote, an electronic document, or even produce an HTML page on the web that can be accessed via a browser of another computer also connected to the computer network 18. The module may include a summary of the data entered, the different steps of the process, an estimate of the payout broken down by precipitation of snow and even a break even point that indicates at what level of precipitation can the payout actually offsets any payment made by the client.

The weather risk management system 20 may be offered by a service provider directly or instead by a hedging service provider who in turn retains the services of the weather service provider and takes a commission on the trade. In one embodiment, a hedging service provider may take a commission added to the premium in the range of 1 to 10%. In another embodiment, the commission may be in the range of 2 to 5%. And more specifically the commission may be approximately 2%. In yet another embodiment, the reporting module may be of greater use by importing into the report 70 to be produced historical pricing to help illustrate past client payments, past trends, or actual savings if precipitations expected this year align with precipitations of selected previous years. For example, a client who has not used the weather risk management system 20 in the past can compare in the report 70 the proposed solution with a previously paid value.

The weather risk management system 20 may also be implemented via spreadsheet software. In another embodiment, what is contemplated is a computer-implemented method for the management of weather associated risk, the method includes the step of connecting a weather risk management system 20 as shown in FIG. 3 implemented via software into the memory of a computer as shown in FIG. 1 to a computer network 18, the weather risk management system 20 including a unitary event module 30 for calculating at least a cost at a site in an area, a global module 40 for calculating at least a base price for services at a plurality of sites from the unitary event module 30, and a hedge assignment module 50 for assigning a premium to the base price. Further, the method includes the step of entering into the weather risk management system at an interface such as the computer 100 a first site sizing data, wherein the unitary event module 30 uploads from a weather database 11 a yearly estimate for the first site and the hedge assignment module 60 uploads from the weather option database 10 a option payout and a premium for an option contract.

In another embodiment of the method, the method further comprises the step of entering at the interface a correction factor for at least the first site into the global module 40 for correcting the base price. The hedge assignment module 60 may upload an option with a tick price leading to a payout at an annual effective precipitation of twice the yearly estimate as described above of the base price plus the premium of the option contract and/or and the price associated with the removal of the snow at the maximum coverage desired.

Persons of ordinary skill in the art appreciate that although the teachings of this disclosure have been illustrated in connection with certain embodiments and methods, there is no intent to limit the invention to such embodiments and methods. On the contrary, the intention of this disclosure is to cover all modifications and embodiments falling fairly within the scope the teachings of the disclosure.

What is claimed is:

1. A computer-implemented method for the risk management and cost containment of weather-related services, the method comprising:

connecting a weather risk management system implemented as a software into a memory of a computer to a computer network, the weather risk management system including a unitary event module for calculating at least a cost at a site in an area, a global module for calculating at least a base price for services at a plurality of sites from the unitary event module, and a hedge assignment module for calculating a tick price and an associated premium for the selection of an option for managing the risk and containing the cost of weather-related services, and wherein the computer network is in data communication with a weather database and a weather option database; and entering into the weather risk management system at an interface a first site sizing data, wherein the unitary event module uploads from the weather database a yearly estimate for the first site and the hedge assignment module uploads from the weather option database a strike price, and the associated premium for the option at a calculated tick size.

2. The computer-implemented method of claim 1, further comprising the step of entering at the interface a correction factor for at least the first site into the global module for correcting the base price.

3. The computer-implemented method of claim 1, wherein the hedge assignment module calculates the tick price from a ultimate coverage desired that is associated with a yearly precipitation of twice the nominal precipitation.

4. The computer-implemented method of claim 1, wherein the ultimate coverage desired is calculated to be an annual effective precipitation of three standard deviations.

\* \* \* \* \*